(12) United States Patent
Nemoto

(10) Patent No.: US 7,650,410 B2
(45) Date of Patent: Jan. 19, 2010

(54) METHOD AND SYSTEM FOR MANAGING PROGRAMS FOR WEB SERVICE SYSTEM

(75) Inventor: Tsuyoshi Nemoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 722 days.

(21) Appl. No.: 11/055,000

(22) Filed: Feb. 9, 2005

(65) Prior Publication Data

US 2005/0210136 A1   Sep. 22, 2005

(30) Foreign Application Priority Data

Feb. 16, 2004   (JP) .............................. 2004-038278

(51) Int. Cl.
*G06F 15/173* (2006.01)
(52) U.S. Cl. .................. 709/225; 709/203; 709/219; 709/226; 709/229; 709/244
(58) Field of Classification Search ................ 709/203, 709/219, 225, 226, 228, 229, 244
See application file for complete search history.

(56) References Cited

U.S. PATENT DOCUMENTS

| | | | |
|---|---|---|---|
| 5,774,660 A * | 6/1998 | Brendel et al. .............. | 709/201 |
| 6,249,801 B1 * | 6/2001 | Zisapel et al. ............... | 718/105 |
| 6,327,622 B1 * | 12/2001 | Jindal et al. ................. | 709/228 |
| 6,785,704 B1 * | 8/2004 | McCanne .................... | 718/105 |
| 6,898,633 B1 * | 5/2005 | Lyndersay et al. .......... | 709/226 |
| 2003/0050966 A1 * | 3/2003 | Dutta et al. ................. | 709/203 |
| 2003/0187974 A1 * | 10/2003 | Burbeck et al. ............. | 709/224 |

OTHER PUBLICATIONS

David A. Chappell and Tyler Jewell, Java Web Services, Mar. 2002, Title page, pp. v through xi and 1 through 25, published by O'Reilly & Associates, Sebastopol, California.

* cited by examiner

*Primary Examiner*—Yves Dalencourt
(74) *Attorney, Agent, or Firm*—Townsend and Townsend and Crew LLP

(57) ABSTRACT

The Web service-providing device receives a request message demanding the Web service through a communication device. When the Web service-providing device transfers the processing of the Web service demanded by the request message to another Web service-providing device and demands the return of a response message containing the request result, it sends a request message with a destination-of-return information header appointing itself as the receiver of the response message through the communication device and executes the transfer. If the Web service-providing device itself has executed the processing transferred through a request message containing the destination-of-return information header, it sends a response message containing the request result to the destination designated in the destination-of-return information header through the communication device.

11 Claims, 10 Drawing Sheets destination-of-return information header

| ID | destination-of-transfer URL | processed-transfer rate | number of requested transfers | number of processed transfers | date of registration |
|---|---|---|---|---|---|
| 1 | http://service B | 80% | 120 | 96 | 2003/04/05 |
| 2 | http://service C | 40% | 80 | 32 | 2003/07/15 |
| 3 | http://service D | 0% | 0 | 0 | 2002/08/20 |
| 4 | http://service E | 10% | 20 | 2 | 2002/08/05 |
| 5 | http://service F | 10% | 40 | 4 | 2002/08/01 |
| 6 | http://service G | 0% | 10 | 0 | 2002/07/10 |

METHOD AND SYSTEM FOR MANAGING PROGRAMS FOR WEB SERVICE SYSTEM

CROSS-REFERENCES TO RELATED APPLICATIONS

The present application is related to and claims priority from Japanese Patent Application No. 2004-038278, filed Feb. 16, 2004, and is hereby incorporated by reference for all purposes.

BACKGROUND OF THE INVENTION

This invention relates to services provided over a communication network, and more particularly to transfer processing in order to provide Web services from among plural Web servers in a network.

Available for multistage Web-service processing, where two or more Web service-processing units are allocated to two or more nodes to provide services (i.e., functions provided by executing programs and objects) in cooperation with one another, is the art described on page 6 in Java Web Services by David A. Chappell et al. published by O'Reilly & Associates, Inc. in March 2002. With this art, Web service-processing units providing the related services perform transfer of service processing to one another in order to reduce the failure to provide reliable services to clients' information-processing devices.

The above prior art has the following problem. If a request is transferred in serial manner from one server to the next to provide Web-service processing, a response to the request is returned in serial manner. Accordingly, those Web service-processing units which merely transfer the request to other units do not need to response but nonetheless participate in passing the response back to the client, thus wasting communication resources and times.

BRIEF SUMMARY OF THE INVENTION

The present invention provides a technique for processing responses to service requests in an efficient manner by reducing unnecessary use of communication resources. According to the present invention, when a Web service-processing unit transfers processing to another Web-service processing unit, the latter returns the result of the processing (request result) to a receiver that is designated in a destination-of-return information header.

When a receiving Web service-providing device (a computer, an information processing device, or a program or object executing such processing, the "receiving server") receives a request message demanding a Web service (functions to be performed by executing programs and objects) from a client device or from another Web service-providing device, the receiving server decides, based on its own condition and the working situations of the other Web service-providing devices, whether or not to transfer processing of the requested Web service to another Web service-providing device. If the receiving server has decided to transfer the processing to another Web service-providing device, then it performs the transfer. If the receiving server has decided to execute the processing itself, it performs the requested Web service itself.

If the receiving server has decided to transfer the processing to another Web service-providing device, it reads out information relating to execution of requested service as performed by the other Web service-providing devices from a destination-of-transfer database and chooses a destination Web service-providing device (destination server) based on the information.

Then, the receiving server decides whether or not it requires a response message containing the request result (a response-bearing message which bears a destination-of-return information header and a response message containing the request result). If the receiving server received a request message directly from a client device, then it has to return the request result to the client device; accordingly, the receiving server will demand the return of a response message containing the request result from the destination server. If the receiving server was itself a recipient of the Web service request from another server, then it does not need a response message containing the request result; accordingly, the receiving server will not demand the return of a response message containing the request result from destination server. Nevertheless, if the receiving server needs the request result for some reason, then it may decide to demand the return of a response message containing the request result.

If the receiving server decided to demand a response message from the destination server, then it sends a request message with a destination-of-return information header designating itself as the receiver of the response message to the destination server via a communication device and executes the transfer.

If the destination server decides to process the requested Web service, it performs appropriate processing and produces a response message. The response message includes the request result for the requested Web service and information that was contained in the header of the request message. Next, the destination server checks to see whether the produced response message contains a destination-of-return information header or not. If the produced response message contains a destination-of-return information header, the destination server produces a response-bearing message which bears the response message in its body part and sends the response-bearing message to the Web service-providing device designated in the destination-of-return information header via a communication device.

The Web service-providing device designated by the destination-of-return information header receives the response-bearing message (the designated receiving server). The server extracts the response message from the response-bearing message and erases the information relating to itself from the destination-of-return information header.

The designated receiving server then checks to see whether there is information for other Web service-providing devices contained in the destination-of-return information header. If there is information about other Web service-providing devices, it sends a response-bearing message, which bears a response message containing the destination-of-return information header in its body part, to the topmost one among the Web service-providing devices listed in the destination-of-return information header. If there are no other Web service-providing devices, it sends the response message to the client device.

According to the present invention, when the processing for providing Web service is transferred, responses are returned efficiently and the unnecessary use of communication resources is reduced.

BRIEF DESCRIPTION OF THE DRAWINGS

These and other features, objects and advantages of the present invention will become more apparent from the following description when taken in conjunction with the accompanying drawings.

DETAILED DESCRIPTION OF THE INVENTION

Described below is an embodiment of Web service-providing device which transfers processing for providing Web service to other Web service-providing devices.

Figure 1:
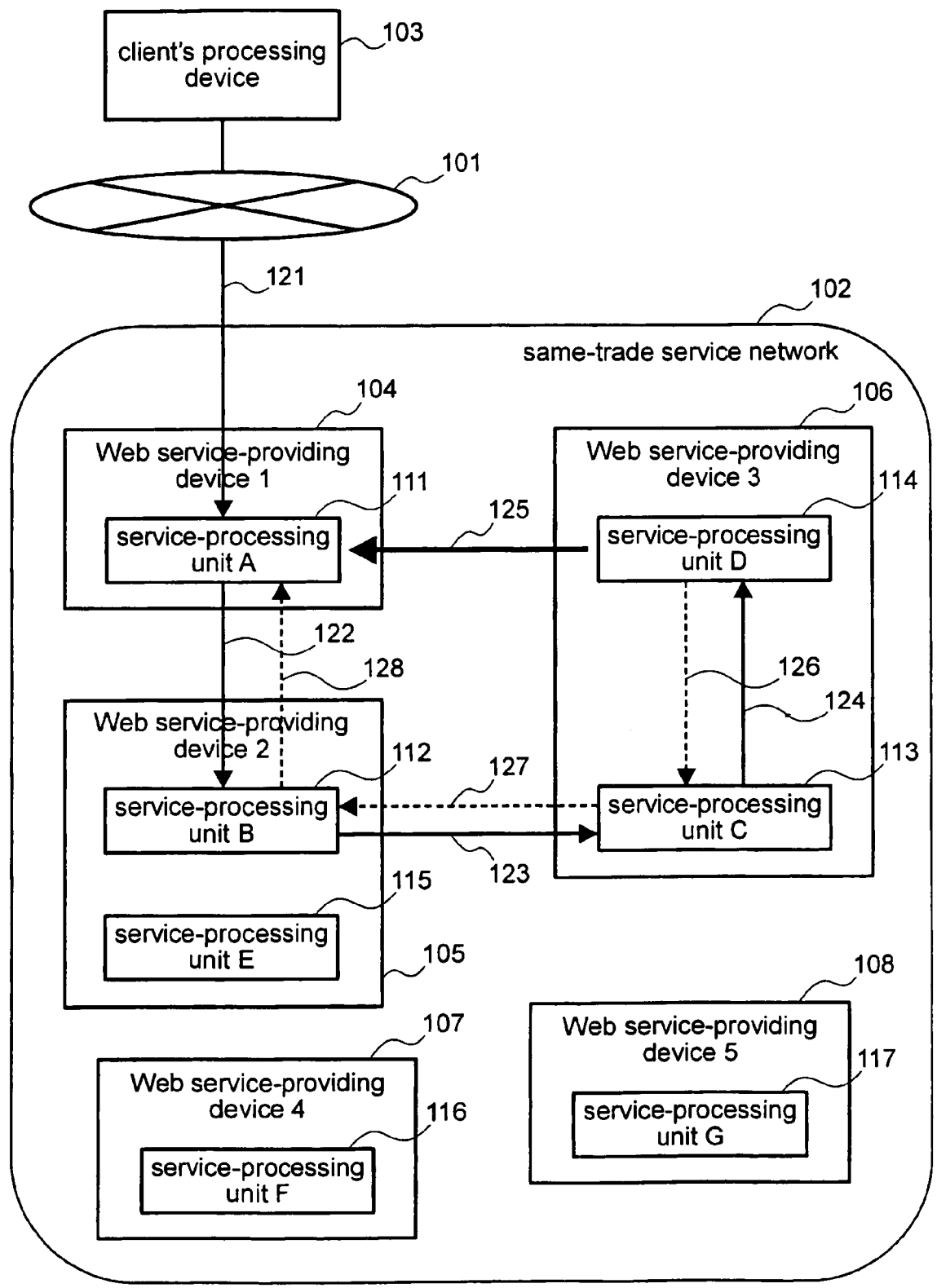
FIG. 1 shows the general construction of a Web-service providing system according to the present invention.

FIG. 1 shows the general construction of a Web service-providing device in accordance with the present embodiment. Existing in the Web service-providing system of FIG. 1 are (i) a same-trade service network 102 comprising service-processing units A111, B112, C113, D114, E115, F116, and G117 which provide services of the same contents and transfer processing to one another and (ii) a client's processing device (client device) 103 connected through a network 101 to the same-trade service network 102. The service-processing units A111, B112, C113, D114, E115, F116, and G117 are distributed among Web service-providing devices 104 to 108.

When the client's processing device 103 wants to receive a certain service (Web service), it sends a request message 121 to the service-processing unit A111 of a Web service-providing device 104 which provides the service. If the service-processing unit A111 can process the request, it processes the request. If it cannot, it transfers the processing of the request to another service-processing unit within the same-trade service network 102. In FIG. 1, the service-processing unit A111 transfers the processing to the service-processing unit B1 12 by sending a request message 122. The service-processing unit B1 12 might have to transfer the processing to the service-processing unit C113 by sending a request message 123 which, in turn, might have to transfers the processing to the service-processing unit D114 by sending a request message 124.

According to the prior art, if the service-processing unit D114 can process the request to provide the requested Web service, a response to the request is returned from the service-processing unit D114 to the service-processing unit C113 through a response message 126. The service-processing unit C113 then sends the response message 126 to the service-processing unit B112 via a response message 127. Finally, the service-processing unit B112 sends the response message to the service-processing unit A111 via a response message 128. However, the service-processing unit B112 and the service-processing unit C113, which merely transferred the processing to the service-processing unit C113 and the service-processing unit D114, do not necessarily need a response. Thus, communication resources are wasted. When a response is returned from the service-processing unit D114 to the service-processing unit A111 through the service-processing units C113 and B112, the service-processing unit C113 or B112 might happen to be inactive, thus delaying the arrival of the response at the service-processing unit A111.

According to the present embodiment, such unnecessary detours of responses (response messages 126-128) are eliminated. Responses are returned efficiently, and waste of communication resources are reduced by sending a response (response message 125) from the service-processing unit D114, which processed the request, to the service-processing unit A111, which received the request directly from the client's processing device 103. Although the client's processing device 103 sends the request message 121 to the service-processing unit A111 in FIG. 1, it may send the request message 121 to any service-processing unit in the same-trade service network 102.

Figure 2:
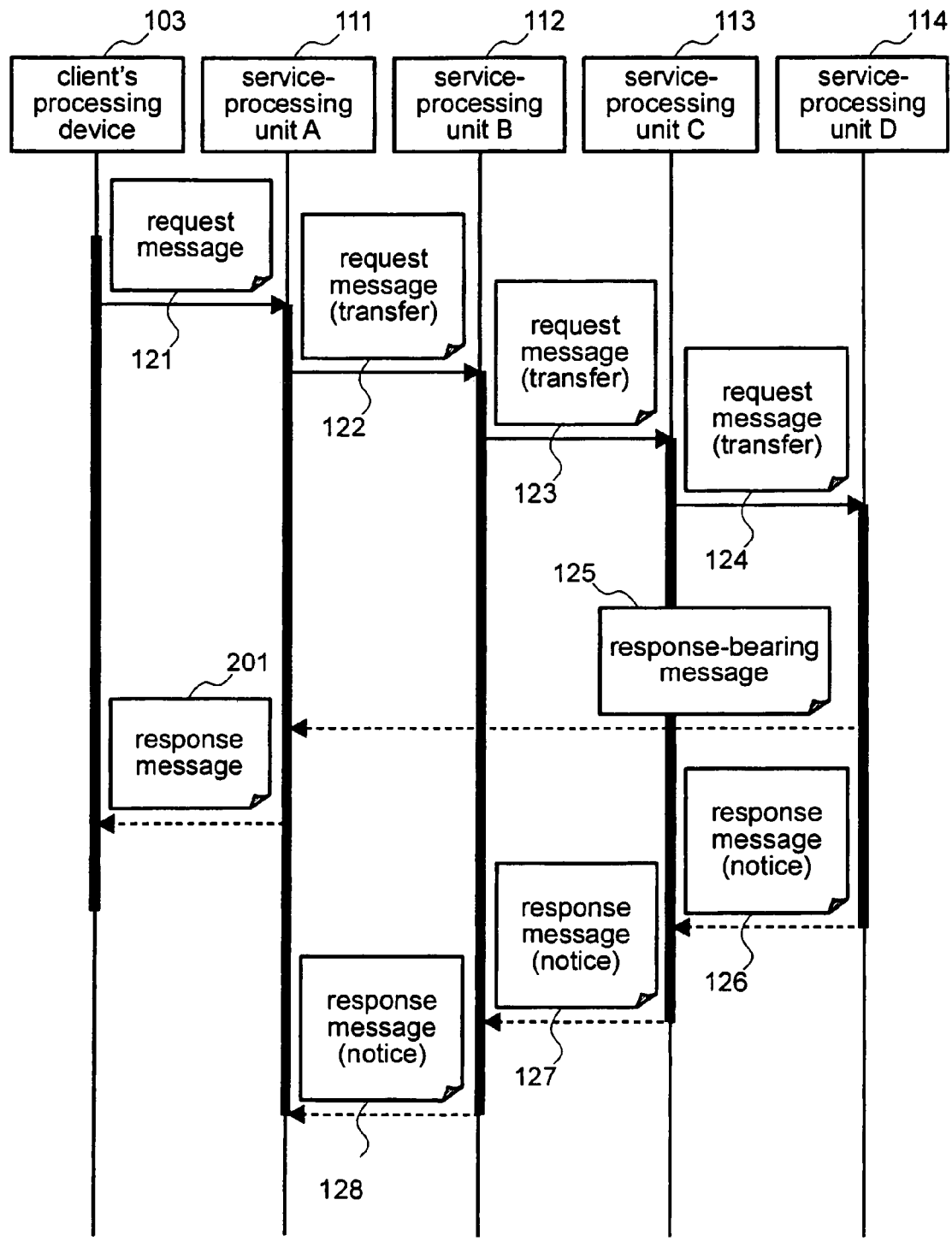
FIG. 2 is an example of sequential processing, by the system of FIG. 1, of a request message 121 from a client's processing device 103.

FIG. 2 shows an example of sequential processing of the request message 121 from the client's processing device 103. First of all, the service-processing unit A111 receives the request message 121 from the client's processing device 103. Then, the service-processing unit A111 sends the request message (transfer) 122 to the service-processing unit B112 to transfer the request to the service-processing unit B112. This action is referred to as "transferred processing", where processing of the requested Web service has been transferred to another server. The phrase "request message (transfer)" as used in this specification refers to a request message that serves to transfer the processing of a requested Web service to another server. In the same way, the service-processing unit B112 sends the request message (transfer) 123 to the service-processing unit C113 to transfer the request to the service-processing unit C113, and the service-processing unit C113 sends the request message (transfer) 124 to the service-processing unit D114 to transfer the request to the service-processing unit D114.

After processing (servicing) the requested Web service, the service-processing unit D114 sends a response-bearing message 125, which bears a response to the request, to the service-processing unit A111. The service-processing unit A111 extracts the response from the response-bearing message 125 and sends a response message 201 to the client's processing device 103.

After sending the response-bearing message 125 to the service-processing unit A111, the service-processing unit D114 sends a response message (notice) 126 to the service-processing unit C113. The phrase of "response message (notice)" as used herein refers to a response message that serves as notification of completion of the transferred processing action. The service-processing unit C113 makes use of the response message (notice) 126 received from the service-processing unit D114 to send a response message (notice) 127 to the service-processing unit B112. In the same way, the service-processing unit B112 sends a response message (notice) 128 to the service-processing unit A111.

As described above, the response message 201 can be returned to the client's processing device 103 only after the response message (notice) 128 has arrived at the service-processing unit A111 in accordance with the prior art, while the response message 201 is sent to the client's processing device 103 immediately after the processing at the service-processing unit D114 has been completed.

Figure 3:
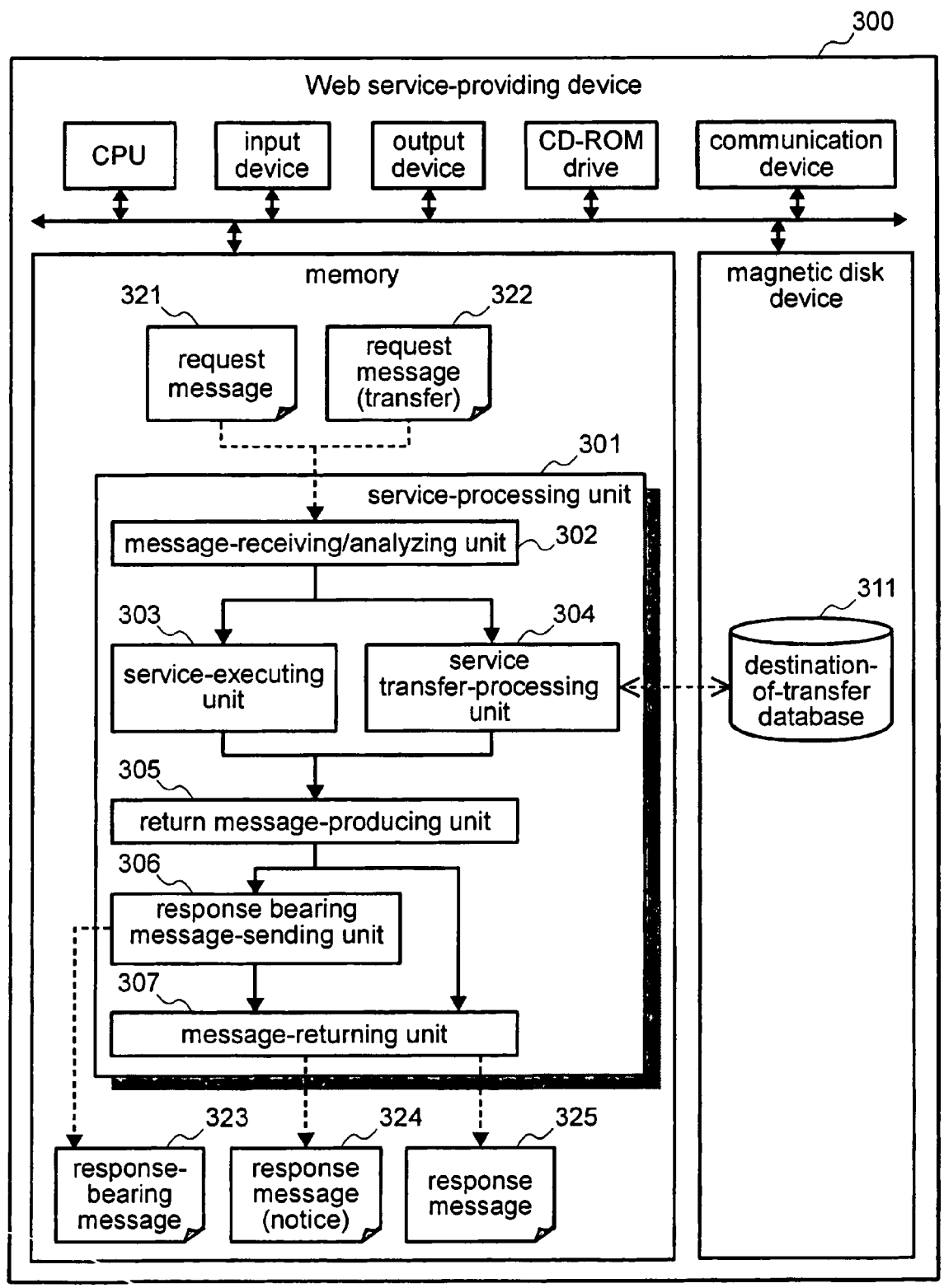
FIG. 3 shows a schematic construction of the Web service-providing device of FIG. 1.

FIG. 3 shows the schematic construction of a Web service-providing device of the present embodiment. As shown in FIG. 3, the Web service-providing device 300 comprises a service-processing unit 301, a message-receiving/analyzing unit 302, a service-executing unit 303, a service transfer-processing unit 304, a return message-producing unit 305, a response bearing message-sending unit 306, and a message-returning unit 307.

The service-processing unit 301 controls the other units which transfer and execute processing to provide Web services. The message-receiving/analyzing unit 302 receives a request message 321 demanding a certain Web service or a request message (transfer) 322 by way of a communication device and analyzes the message.

The service-executing unit 303 executes the processing of the Web service contained in the request message 321. If the service-processing unit 301 is to (i) transfer the processing of the Web service requested by the request message 321 to another service-processing unit 301 and (ii) demand the return of the request result from the other service-processing unit 301, then its service transfer-processing unit 304 transfers the processing to the other service-processing unit 301 by sending a request message (transfer), and includes a destination-of-return information header designating itself as the receiver of a response-bearing message.

The return message-producing unit 305 produces return messages from the result of transfer or the result of processing. If the service-processing unit 301 has executed the processing transferred through a request message (transfer) with a destination-of-return information header from another service-processing unit 301, then its response bearing message-sending unit 306 sends a response-bearing message 323 to the destination designated in the destination-of-return information header. Its message-returning unit 307 sends a response message (notice) 324 or a response message 325 to the sender of the request message (transfer) 322 or the sender of the request message 321.

Executable programs execute on the Web service-providing device 300 to provide the various functions such as the service-processing unit 301, the message-receiving/analyzing unit 302, the service-executing unit 303, the service transfer-processing unit 304, return message-producing unit 305, the response bearing message-sending unit 306, and the message-returning unit 307. These programs can be stored on a hard drive or stored on other media such as CD-ROM, firmware, and so on and loaded into memory and executed by the processing hardware of the Web service-providing device 300. The programs can be stored on the network other than in the Web service-providing device 300.

The Web service-providing device 300 has a database 311 which holds information on the other Web service-providing devices 300 in the same-trade service network 102. The database 311 holds necessary information for the service transfer-processing unit 304 to choose another Web service-providing device 300 to process or otherwise service the requested Web service.

When the service-processing unit 301 of the receiving Web service-providing device 300 receives a request message 321 or request message (transfer) 322, it decides whether to execute or to transfer the processing depending on the contents of the request and on its own condition. The receiving server then either executes (performs, services) the Web request itself or transfers the processing to another server accordingly. Then, the service-processing unit 301 sends out a response-bearing message 323 and a response message (notice) 324 if there is a demand for it to send the result of transfer or processing to a specific destination of return. If not, the service-processing unit 301 sends out a response message 325 as in the case of the prior art.

Figure 4:
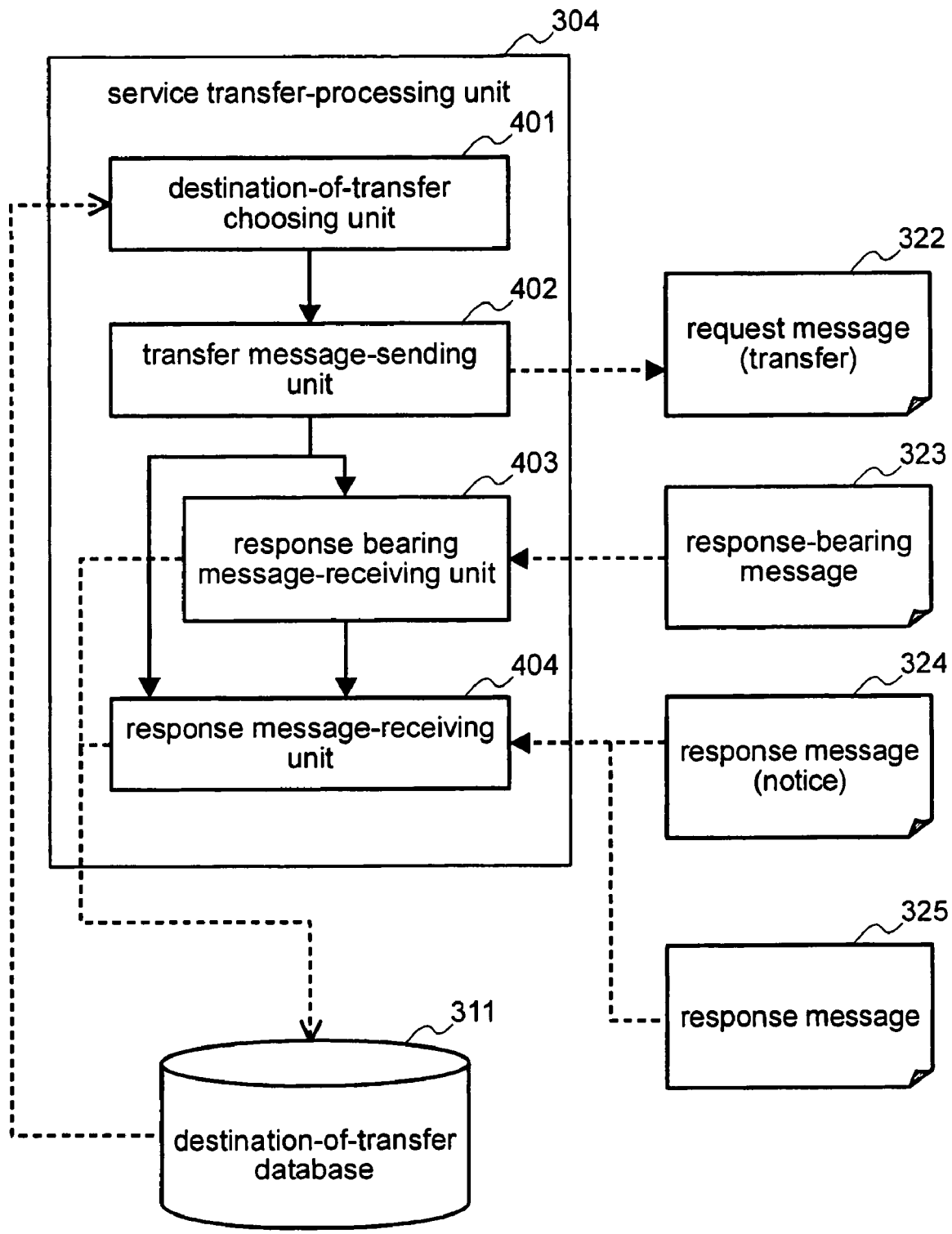
FIG. 4 shows the construction of the service transfer-processing unit 304 of FIG. 3.

FIG. 4 shows the construction of the service transfer-processing unit 304 of the service-processing unit 301 of the Web service-providing device 300 of FIG. 3. The service transfer-processing unit 304 operates when it has been decided that a request received should be transferred. The service transfer-processing unit 304 comprises a destination-of-transfer choosing unit 401 to choose a candidate service-processing unit 301 to which the processing of requested Web service is transferred. A transfer message-sending unit 402 sends a request message (transfer) 322 to the other service-processing unit 301. A response bearing message-receiving unit 403 receives a response-bearing message 323 if the service-processing unit 301 is the receiver of the request result. A response message-receiving unit 404 receives a response message (notice) 324 or response message 325.

The destination-of-transfer choosing unit 401 uses the database 311 to choose the candidate service-processing unit 301. The response bearing message-receiving unit 403 and the response message-receiving unit 404 updates the database 311 based on information on the destinations of received messages.

Figure 5:
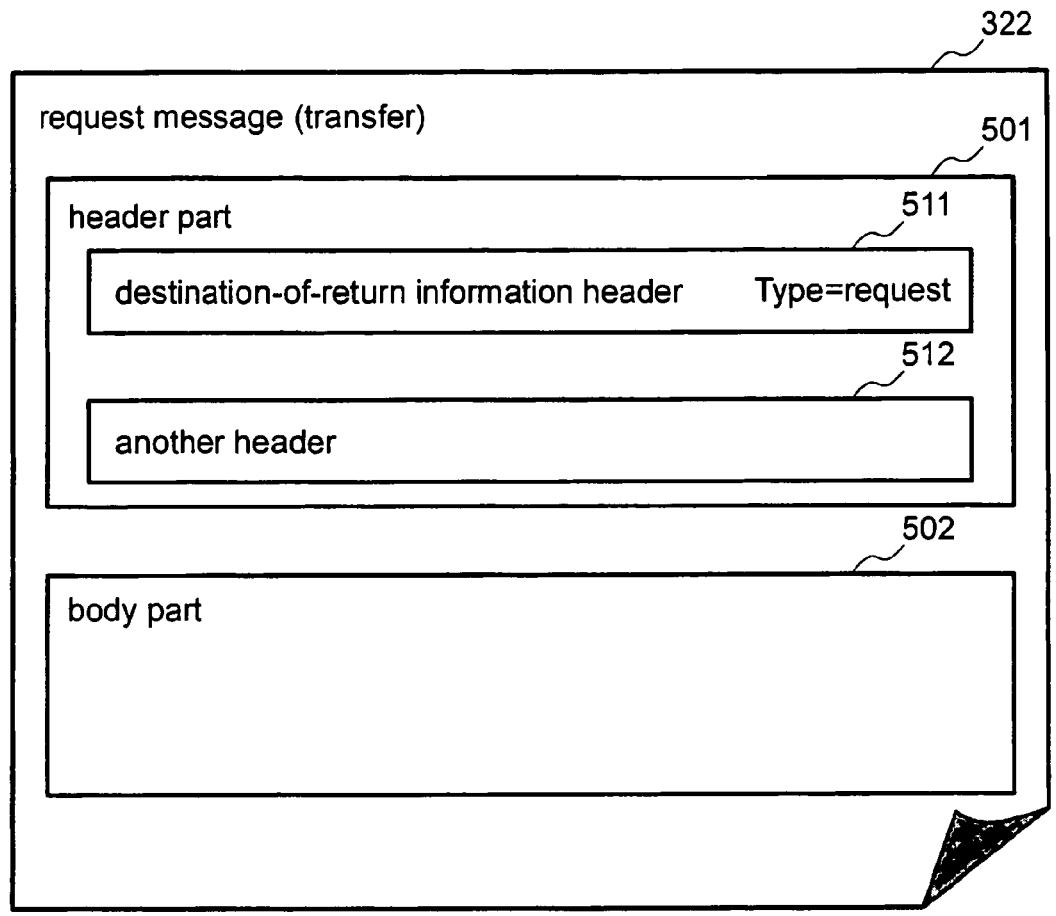
FIG. 5 is an example of the format of the request message (transfer) of FIG. 4.

FIG. 5 shows an example of the format of the request message (transfer) 322 of FIG. 4. The request message (transfer) 322 is expressed in XML (Extensible Markup Language) and has a header part 501 and a body part 502 as constituents. The header part 501 comprises information about control of the Web service. In accordance with the present invention, the header part 501 includes a destination-of-return information header 511 and another header 512. The destination-of-return information header 511 contains information on the destination of the response-bearing message 323, and the header 512 and the body part 502 contain the contents, etc. of the processing to be transferred.

Figure 6:
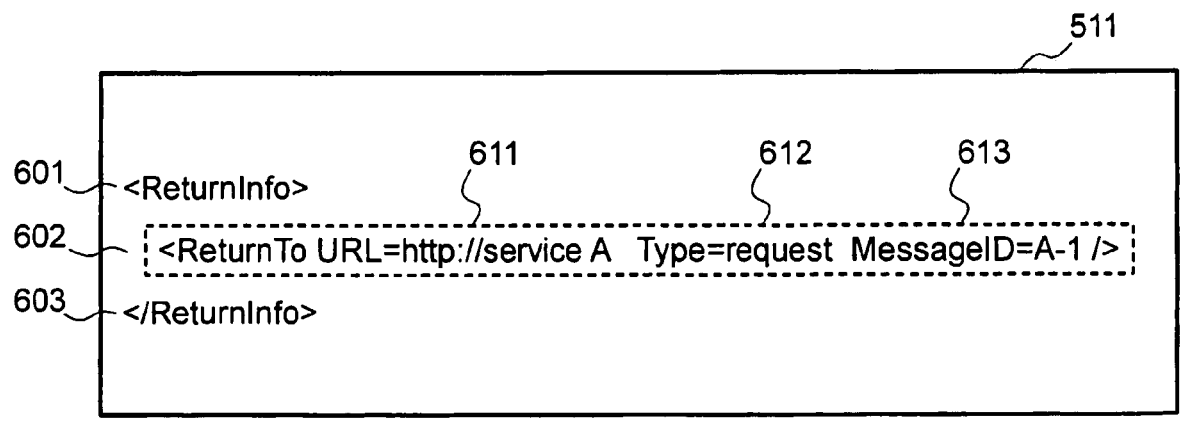
FIG. 6 is an example of contents of the destination-of-return information header 511 of the request message (transfer) of FIG. 5.

FIG. 6 is an example of the contents of the destination-of-return information header 511. As shown in FIG. 6, the destination-of-return information header 511 includes information relating to the destination of return 602 by defining the information with an opening tag 601 and an ending tag 603. There is a single destination of return in this example, but the destination of return 602 can comprise a list of two or more destinations of return.

The information on the destination of return 602 contains a URL attribute 611 showing the URL (Uniform Resource Locator) of the destination of return, a type attribute 612 showing the present state of the message, and a message-identifier attribute 613 showing which message at the destination of return the message corresponds to.

There are three types of type attribute 612. A "request" attribute indicates that the message is a request message. A "response" attribute indicates that the message is a response to a request. A "notice" attribute indicates that a response-bearing message 125 has already been sent out. If the type attribute 612 is of "notice," then the message containing the destination-of-return information header 511 is a response message (notice) 324.

The message containing the destination-of-return information header 511 of FIG. 6 is a message of attribute type "request". The destination of return of a response-bearing message corresponding to the request message is the service-processing unit "A," and the message at the service-processing unit "A" corresponding to the request message has an identifier of "A-1."

If two or more pieces of information on the destinations of return 602 are to be set, each piece of information is set on the immediately preceding one. When a destination of return has received message with a destination-of-return information header 511, the destination of return erases the piece of information that identifies itself from the destination-of-return information header 511 and forwards the message to the next destination of return, if any.

Figure 7:
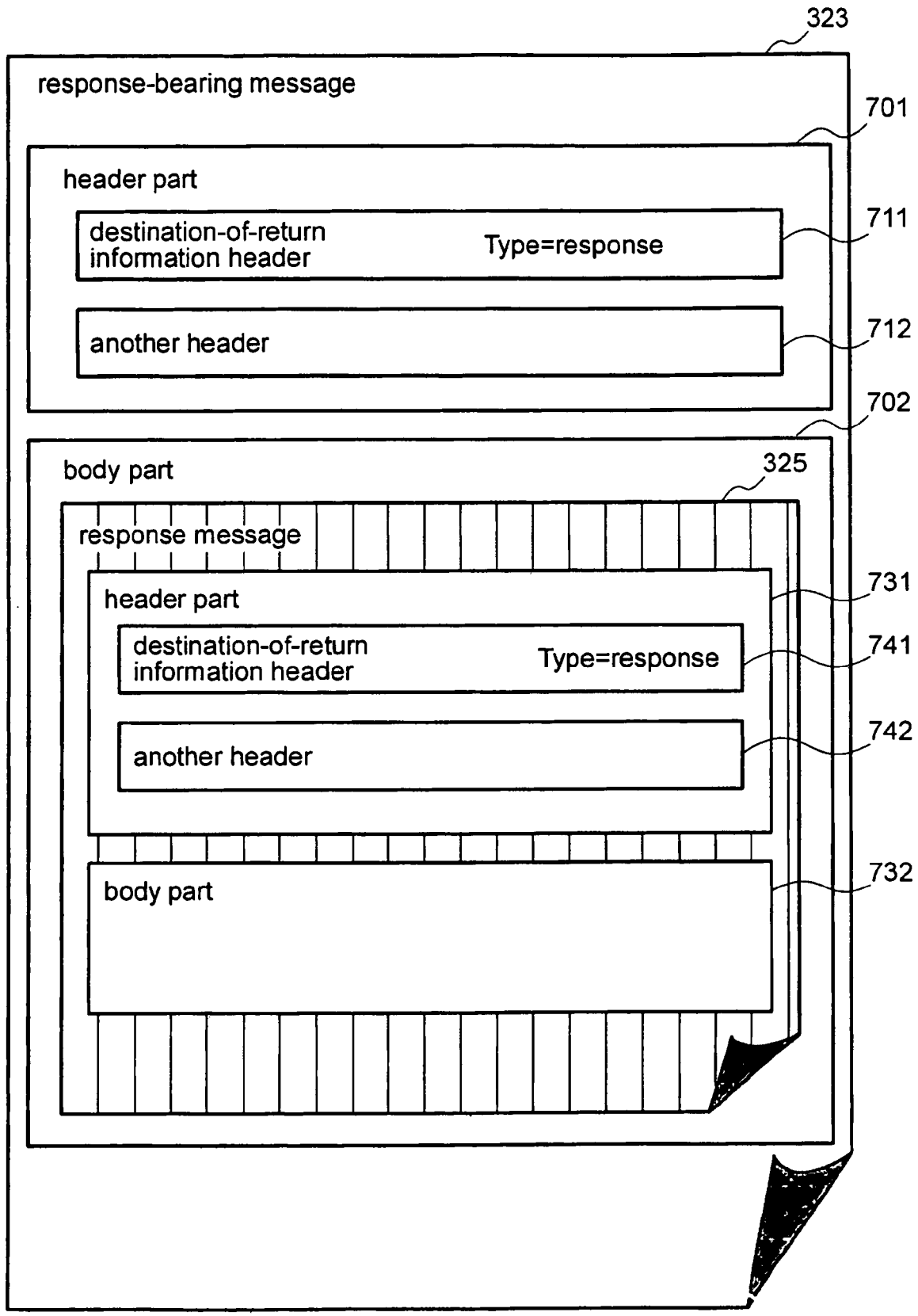
FIG. 7 is an example of the format of the response-bearing message 323 of FIG. 4.

FIG. 7 shows an example of the format of the response-bearing message 323. The response-bearing message 323 is expressed in XML (Extensible Markup Language) and has a header part 701 and a body part 702 as constituents. The contents of the header part 701 are the same as those of the header part 501. The body part 702 contains a single response message 325. The response message 325 is itself in a form of a message and has a header part 731 and a body part 732 as constituents. The construction of the header part 731 of the response message 325 is the same as that of the header parts 501 and 701. The body part 732 of the response message 325 contains information about the actual response of the result, etc. of processing of Web service. Because the response message 325 is itself in a form of message as mentioned above, a service-processing unit 301, which has received the response-bearing message 323, can extract the response message 325 and send it to another service-processing unit 301 or the client's processing device 103. To indicate that the contents of the response-bearing message 323 and the response message 325 are responses to the request, a value indicating a response is set in the type attributes 612 of the destination-of-return information headers 711 and 741.

Figures 8, 9:
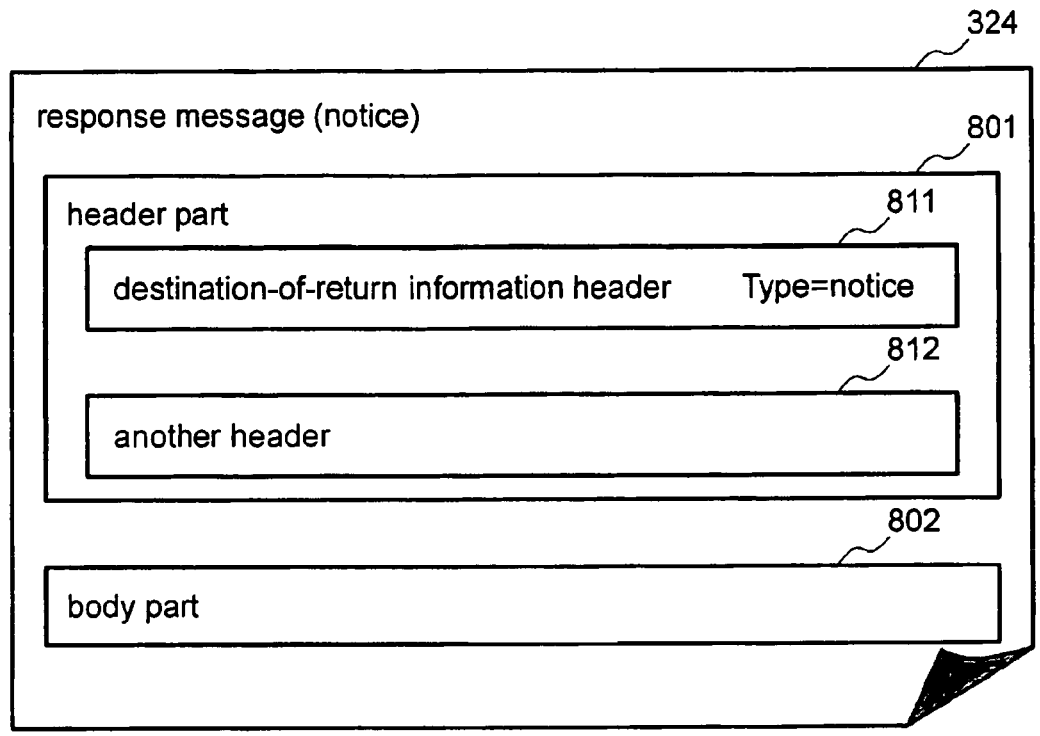
FIG. 8 is an example of the format of the response message (notice) 324 of FIG. 4.
FIG. 9 is an example of the format of data of the destination-of-transfer database 311 of FIGS. 3 and 4.

FIG. 8 shows an example of the format of the response message (notice) 324 of the present embodiment. The response message (notice) 324 as well as the other messages is expressed in XML (Extensible Markup Language) and has a header part 801 and a body part 802 as constituents. The header part 801 as well as the other header parts comprises a destination-of-return information header 811 and another header 812. The role of the response message (notice) 324 is to notify another service-processing unit 301 that a response-bearing message 323 has already been sent to the destination of return. Accordingly, the body part 802 has no constituent in particular and a value indicating notification is set in the type attribute 612 of the destination-of-return information header 811.

FIG. 9 is an example of the data format of the destination-of-transfer database 311 of the present embodiment. As shown in FIG. 9, the destination-of-transfer database 311 has a destination-of-transfer identifier 911, a destination-of-transfer URL 912, a processed-transfer rate 913, the number of requested transfers 914, the number of processed transfers 915, and the date of registration 916 showing the date of registration of each record as attributes. The record 902 of information on service-processing unit B112 shows that the service-processing unit B112 was registered with the destination-of-transfer database 311 of the service-processing unit A111 on Apr. 5, 2003, that it processed 80% of the requested transfers from the service-processing unit A111, and that the numbers of requested and processed transfers are 120 and 96, respectively. The destination-of-transfer choosing unit 401 of the service transfer-processing unit 304 chooses a destination of transfer based on the above information. The response bearing message-receiving unit 403 and the response message-receiving unit 404 update the above information based on the contents of received messages.

Figure 10:
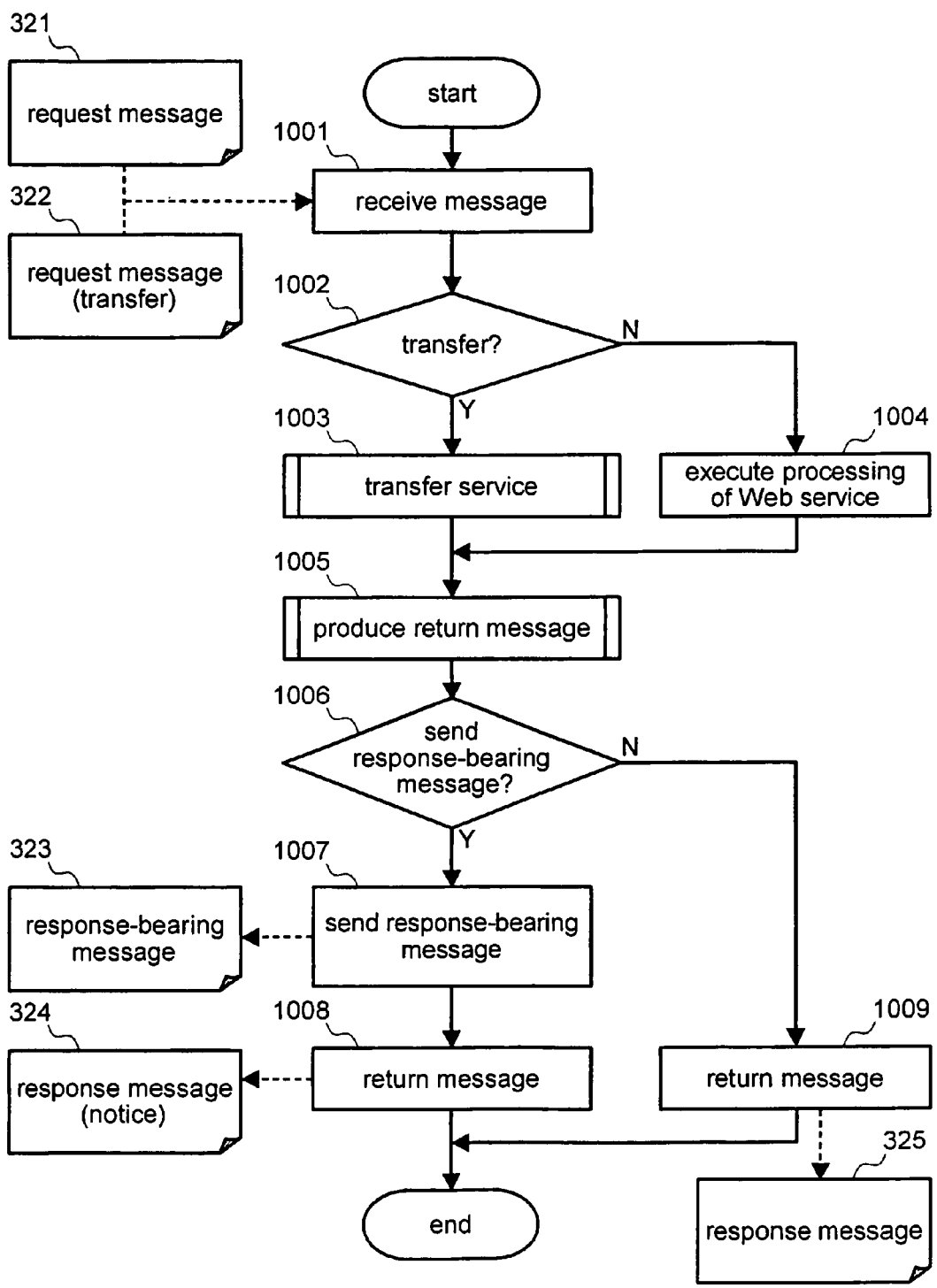
FIG. 10 is a flowchart of the processing by the Web service-providing device 300 of FIG. 3.

FIG. 10 is a flowchart of the processing by a service-processing unit 301 of a Web service-providing device 300. In Step 1001, the message-receiving/analyzing unit 302 of the service-processing unit 301 checks to see if any request message 321 is sent out from the client's processing device 103 or any request messages (transfer) 322 are sent out from other service-processing units 301. If messages are sent out, the message-receiving/analyzing unit 302 of the service-processing unit 301 receives them through a communication device and stores them into a memory.

In Step 1002, the message-receiving/analyzing unit 302 of the service-processing unit 301 reads out the messages from the memory and analyzes them to decide whether to transfer the request to another service-processing unit 301 or not. This decision may be made based on the processing load on the service-processing unit 301 or the working conditions of the other service-processing units 301. The decision may be made by adding attributes to the destination-of-transfer database 311 of the service-processing unit 301 and making use of it.

If it has been decided in Step 1002 that the request should be transferred to another service-processing unit 301, then the service transfer-processing unit 304 of the service-processing unit 301 sends a request message (transfer) 322 with a destination-of-return information header 511 to the other service-processing unit 301 to transfer the request ("transferred process" action) to the other service-processing unit 301 in Step 1003. If it has been decided in Step 1002 that the request should be processed by the service-processing unit 301, then the service-processing unit 301 proceeds to Step 1004. In Step 1004, the service-executing unit 303 of the service-processing unit 301 executes the processing of Web service requested by the request message 321.

Next, in Step 1005, the return message-producing unit 305 of the service-processing unit 301 produces return messages from the result of the transfer in Step 1003 or the request result in Step 1004. The return messages are two kinds; i.e., a pair of a response-bearing message 323 and a response message (notice) 324, and a response message 325. The processing thereafter depends on which return message has been produced.

In Step 1006, it is examined whether a response-bearing message 323 has been produced or not in Step 1005. If a response-bearing message 323 has been produced in Step 1005, the service-processing unit 301 proceeds to Step 1007. If no response-bearing message 323 has been produced in Step 1005, the service-processing unit 301 proceeds to Step 1009.

In Step 1007, the response bearing message-sending unit 306 reads the URL attribute 611 showing the URL of the destination of return from the destination-of-return information header 511 of the response-bearing message 323 produced in Step 1005 and sends the response-bearing message 323 to the destination of return shown by the URL attribute 611. Then, in Step 1008, the message-returning unit 307 sends the response message (notice) 324 produced in Step 1005 to the sender of the request message (transfer) 322. In Step 1009, the message-returning unit 307 sends the response message 325 to the sender of the request message 321.

Figure 11:
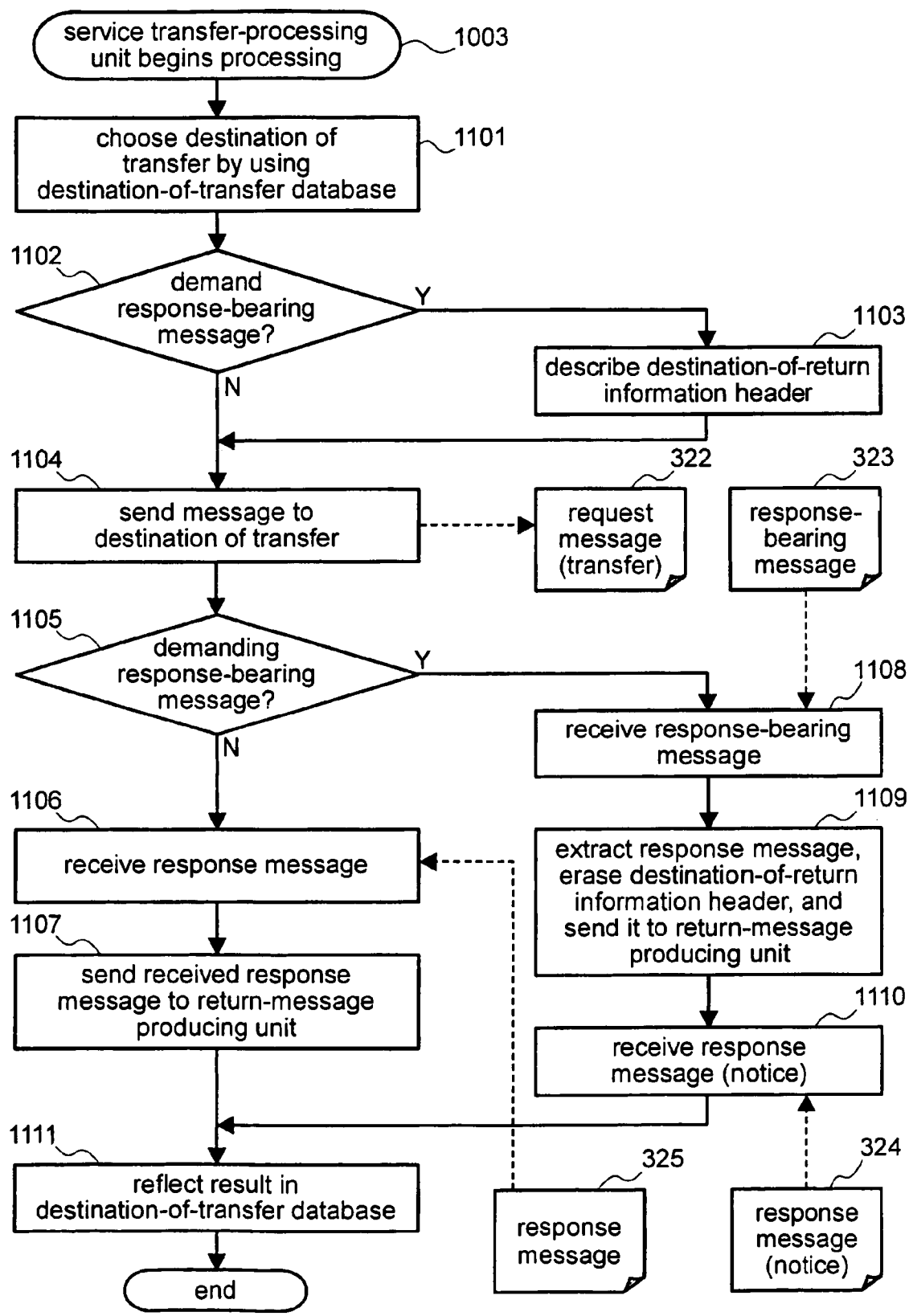
FIG. 11 is a flowchart of the processing by the service transfer-processing unit 304 of FIG. 4.
Figure 12:
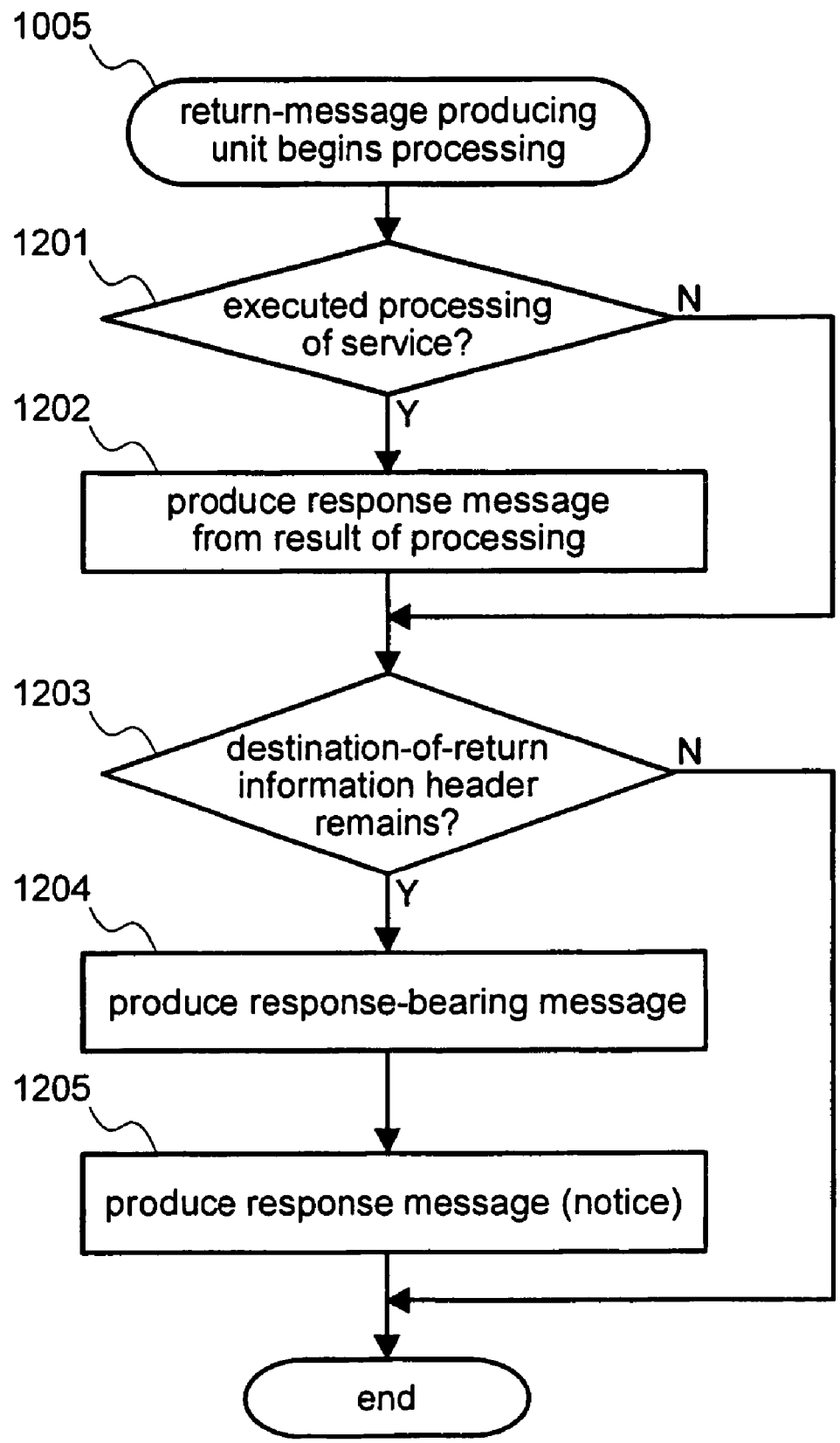
FIG. 12 is a flowchart of the processing by the return message-producing unit 305 of FIG. 3.

FIGS. 11 and 12 show the details of the processing in Steps 1003 and 1005, respectively, of FIG. 10. The processing in these steps will be described below. FIG. 11 is a flowchart for performing a transferred processing action whereby processing of the requested Web service is transferred by the service transfer-processing unit 304 of the current service-processing unit 301 to another service-processing unit 301.

In Step 1003, the service transfer-processing unit 304 begins performing the transferred processing action. In Step 1101, the service transfer-processing unit 304 of the service-processing unit 301 reads out information from the destination-of-transfer database 311 of the service-processing unit 301. The destination-of-transfer database 311 shows the history of processing of the requested Web service as performed by other service-processing units 301. A candidate service-processing unit 301 is chosen based on the information contained in the destination-of-transfer database 311. The service transfer-processing unit 304 may choose a service-processing unit 301 with the highest processed-transfer rate 913, a service-processing unit 301 with the latest registration date, or a service-processing unit 301 which meets the combination of the two conditions, or based on other suitable criteria.

Next, in Step 1102, if the service-processing unit 301 has received a request message 321 directly from the client's processing device 103, the service-processing unit 301 has to return the result of the requested processing to the client's processing device 103; accordingly, the service transfer-processing unit 304 of the service-processing unit 301 decides to demand the return of a response-bearing message 323. If the service-processing unit 301 has received a request message (transfer) 322, the service-processing unit 301 does not need the result of the transferred processing action; accordingly, the service transfer-processing unit 304 of the service-processing unit 301 decides not to demand the return of a response-bearing message 323. Even in this case, if the service-processing unit 301 needs the result of the transferred processing action for some reason, its service transfer-processing unit 304 may decide to demand the return of a response-bearing message 323.

If the service transfer-processing unit 304 of the service-processing unit 301 has decided to demand the return of a response-bearing message 323 in Step 1102, then in Step 1103 the service transfer-processing unit 304 inserts the URL attribute 611 of the service-processing unit 301 and the message-identifier attribute 613 to identify the current message being processed into a destination-of-return information header 511 of a request message (transfer) 322. If the service-processing unit 301 received a request message (transfer) 322 in Step 1001 and a destination-of-return information header 511 is already included in the request message (transfer) 322, its service transfer-processing unit 304 simply adds the URL attribute 611 and the message-identifier attribute 613 to the destination-of-return information header 511 to the existing request message (transfer) 322. If the service-processing unit 301 does not demand the return of a response-bearing message 323, the request message (transfer) 322 received in Step 1001 is sent out without modification.

In Step 1104, the request message (transfer) 322 is sent through a communication device to the service-processing unit 301 that was chosen in Step 1101.

The processing thereafter depends on whether or not the service transfer-processing unit 304 decided to demand the return of a response-bearing message 323. In Step 1105, it is examined whether or not the service transfer-processing unit 304 decided to demand the return of a response-bearing message 323. If the service transfer-processing unit 304 decided to demand the return of a response-bearing message 323, then the service-processing unit 301 proceeds to Step 1108, where the service-processing unit 301 waits for and receives a response-bearing message 323.

If a service-processing unit 301 transferred two or more requests to other service-processing units 301, it is necessary to determine which response-bearing message 323 corresponds to which request message (transfer) 322. Accordingly, in Step 1109, by making use of the message-identifier attribute 613 of the destination-of-return information header 511 of a response-bearing message 323, the response-bearing message 323 cam be matched with its corresponding request message (transfer) 322.

Then, the service-processing unit 301 extracts a response message 325 from the response-bearing message 323. The information that identifies the service-processing unit 301 is deleted from the destination-of-return information header 511 of the response message 325. The updated response message 325 is then sent to the return-message producing unit 305.

Further, in Step 1110, the service-processing unit 301 waits for and receives a response message (notice) 324 corresponding to the request message (transfer) 322. The service-processing unit 301 does not have to send the response message (notice) 324 to the return-message producing unit 305. Processing then proceeds to Step 1111.

Returning to Step 1105, if the service transfer-processing unit did not decide to demand the return of a response-bearing message 323 in Step 1102, then the service-processing unit 301 proceeds to Step 1106. There, the service-processing unit 301 waits for a response message 325 corresponding to the request message (transfer) 322. When the response message 325 is received, it is sent to the return-message producing unit 305 (Step 1107), after which point processing completes.

In Step 1111, the outcomes of processing at the other service-processing units 301 are updated in the destination-of-transfer database 311. With such a series of operations, when the service-processing unit 301 has transferred the processing of the Web service to another service-processing unit 301, it becomes possible to either receive a response message or receive a response message immediately after the processing, which is one of the features of the present embodiment.

FIG. 12 is a flowchart of processing that is performed by the return message-producing unit 305 of the present embodiment. When the return message-producing unit 305 begins processing in Step 1005, the return message-producing unit 305 examines the result in the Step 1002 to see whether its service-processing unit has processed the requested transfer or not. If the service-processing unit 301 has processed the request, the service-processing unit 301 proceeds to Step 1202.

In Step 1202, the return message-producing unit 305 produces a response message 325 containing a header part of the request message and the result of processing on the basis of the result in Step 1002. Further, if the service-processing unit 301 has not processed the request, namely, if the service-processing unit 301 has transferred the request to another service-processing unit, as shown in FIG. 11, the service transfer-processing unit 304 will have already produced the response message 325.

In Step 1203, the service-processing unit 301 refers to the header part in the response message 325 produced by the return-message producing unit 305 or the service transfer-processing unit 304, and examines if the destination-of-return information header 511 remains there. If it remains there, a response-bearing message 323 must be sent according to the destination-of-return information. Therefore, in Step 1204, the return message-producing unit 305 produces a response-bearing message 323 containing a response message 325 in its body part and, in Step 1205, produces a response message (notice) 324 corresponding to the response.

On the other hand, as a result of the examination in Step 1203, when there remains no destination-of-return information header 511 in the header part of the response message 325 produced by the return-message producing unit 305 or the service-transfer processing unit 304, it is not necessary to produce the response-bearing-message 323. Therefore, the processing by the return message-producing unit 305 is completed.

Further, in the above embodiment, the same-trade service network 102 in which service-processing units provide services of the same contents and transfer processing to one another is used as an example. However, load information may be stored in the destination-of-transfer database 311 to be applied to a load-distribution network, and a destination of the transfer may be decided according to the load.

Also, according to the present embodiment, the destination-of-transfer database 311 is described as a table. However, the information of the destination-of-transfer database 311 may be stored in text format or in other formats. Further, in the present embodiment, the destination-of-transfer database 311 is kept in the Web service-providing device. However, the destination-of-transfer database 311 may be placed outside the Web service-providing device and shared on a network.

As described above, according to the Web service-providing device of the present embodiment, when its Web service-processing unit transfers processing to another Web-service processing unit, the latter returns the request result to a receiver designated in a destination-of-return information header. The present invention makes it possible for a Web service-providing device to transfer the processing for providing Web service to other Web service-providing devices. Therefore, it is possible to return responses efficiently and to reduce the unnecessary use of communication resources.

What is claimed is:

1. A method of transfer processing in a service network comprising a plurality of web-service providing devices, the method comprising:
   receiving a request for web services at a first web-service providing device;
   deciding whether to transfer processing of the request to second web-service providing devices or to process the request at the first web-service providing device;
   transferring the request without processing the request at the first web-service providing device when a decision is made to transfer processing, wherein transferring the request comprises:
      producing a transfer message having a destination-of-return header with information about the first web-service providing device and a body part including information for processing the request,
      sending the transfer message from one second web-service providing device to another second web-service providing device until a destination web-service processing device is reached,
      deciding whether to receive a response-bearing message corresponding to the transfer message and when a decision is made to receive the response-bearing message:
      adding information to the destination-of-return header,
      receiving the response-bearing message,
      removing the added information from the destination-of-return header, and
      sending the response-bearing message with the added information removed to a next web-service providing device based on the destination-of-return header,
   receiving at the first web-service providing device a response message corresponding to the transfer message, the response message containing a result of processing the request, and
   extracting the result of processing the request from the response message at the first web-service processing device;
   processing at the first web-service providing device the request for web services to obtain a result when a decision is made not to transfer processing; and
   sending a return message with the result of processing the request to the client device.

2. The method of claim 1, wherein the first web-service providing device receives the response message directly from the destination web-service providing device such that the response message bypasses at least one of the second web-service providing devices to which the transfer message was sent.

3. The method of claim 1, wherein sending the transfer message further comprises requesting notification that the processing of the request is complete at the destination web-service providing device.

4. The method of claim 1, wherein sending the transfer message further comprises identifying a candidate second web-service providing device to receive the transfer message based on a processing load of the candidate device.

5. The method of claim 1, wherein sending the transfer message further comprises retrieving information from a destination-of-transfer database.

6. The method of claim 1, wherein the step of deciding further comprises determining a load level of the first web-service providing device.

7. A web service-providing device, comprising:
   a service processing unit, comprising:
      a message receiving-analyzing unit coupled to a service-providing network and configured to receive a request for web services from a client device and response messages from second web service-providing devices, the message received analyzing unit configured to decide whether to transfer processing of the request to a selected one of the second web service-providing devices or to process the request at the web service-providing device and to receive response-bearing messages, wherein the request is not processed at the web service-processing device when a decision to transfer processing is made,
      a service transfer-processing unit coupled to the message-receiving unit and configured to produce a transfer message having a destination-of-return header with information about the web service-processing device and a body part including information for processing the request, to send the transfer message to the selected one of the second web-service providing devices, and to extract a result of processing the request from a response message corresponding to the transfer message when a decision is made to transfer processing, the service transfer-processing unit configured to selectively request a response-bearing message corresponding to the transfer message and, when a response-bearing message is requested, to add information to the destination-of-return header, to remove the added information from the destination-of-return header when the response-bearing message is received, and to send the response-bearing message with the added information removed to a next web service-providing device based on the destination-of-return header, a service-executing unit coupled to the message receiving-analyzing unit and configured to process the request for web services to obtain a result when a decision is made not to transfer processing, and a message-returning unit coupled to the service transfer-processing unit and the service-executing unit and configured to send a return message comprising the result of processing the request to the client device.

8. The device of claim 7, wherein the service transfer-processing unit is configured to request a notification that the processing of the request is complete.

9. The device of claim 7, wherein the service transfer-processing unit is configured to retrieve infonnation about the second web service-providing devices from a destination-of-transfer database.

10. The device of claim 9, wherein the information retrieved from the destination-of-transfer database comprises a processing load of the second web service-providing devices.

11. The device of claim 7, wherein the service transfer-processing unit is configured to transfer the request based on a load level of the web service providing-device.

* * * * *